US006963476B2

(12) United States Patent
Chang

(10) Patent No.: US 6,963,476 B2
(45) Date of Patent: Nov. 8, 2005

(54) METHOD FOR MANUFACTURING RESETTABLE FUSES AND THE RESETTABLE FUSE

(76) Inventor: Jung-Chien Chang, 10F, No. 17, Lane 15, Painien 2nd Street, Lungtang Hsiang, Taoyuan Hsien (TW)

( * ) Notice: Subject to any disclaimer, the term of this patent is extended or adjusted under 35 U.S.C. 154(b) by 103 days.

(21) Appl. No.: 10/631,753

(22) Filed: Aug. 1, 2003

(65) Prior Publication Data

US 2005/0023240 A1 Feb. 3, 2005

(51) Int. Cl.7 .................................................. H02H 5/00
(52) U.S. Cl. .......................... 361/104; 361/58; 361/103
(58) Field of Search .......................... 361/58, 103, 104, 361/106

(56) References Cited

U.S. PATENT DOCUMENTS 4,366,461 A * 12/1982 Tawfik ....................... 337/159
4,409,582 A * 10/1983 Kimmel et al. ............. 337/231
5,485,137 A * 1/1996 Maleus et al. .............. 337/295

* cited by examiner

*Primary Examiner*—Stephen W. Jackson
(74) *Attorney, Agent, or Firm*—Fei-Fei Chao; Bingham McCutchen LLP

(57) ABSTRACT

A method for manufacturing resettable fuses has acts of forming multiple first and second bottom electrodes in pairs on a substrate, laminating a fuse layer on the substrate, forming multiple top electrodes respectively over the pairs of bottom electrodes, forming multiple conductive holes respectively through the top electrodes and the second bottom electrodes, removing the substrate, optionally forming isolation and contact elements and separating individual resettable fuses. Thereby, the manufacturing process and the structure of the resettable fuse are simplified, and the hold current of the resettable fuse is increased.

4 Claims, 8 Drawing Sheets

METHOD FOR MANUFACTURING RESETTABLE FUSES AND THE RESETTABLE FUSE

BACKGROUND OF THE INVENTION

1. Field of the Invention

The present invention relates to a method for manufacturing resettable fuses, and more particularly to a method for manufacturing resettable fuses that transmit more current than conventional resettable fuses of the same size. Structures of the resettable fuse are also disclosed.

2. Description of Related Art

Protective elements are mounted inside electronic products to prevent a fault or short in one or more circuits from causing a current overload in the electronic products. Fuses are commonly used as protective elements and have various configurations to satisfy different electronic products.

Standard fuses are a one-time-use device that must be replaced after an overload condition has been cleared because a thin strip or ribbon of metal melts to open the circuit and cannot be rejoined after it has melted. To overcome this feature of the standard fuse, a conventional resettable fuse has been developed to replace the standard fuse and fundamentally contains a polymer material exhibiting a positive temperature coefficient of resistance (PTC) and two electrodes clamping the PTC polymer material. The PTC polymer material is conductive at normal current and temperature since conductive particles inside the PTC polymer material form chains or paths along which electrons pass. When the PTC polymer material is exposed to excessive current, resistive heating generated by the excessive current through the conductive particle chains causes the PTC polymer material temperature to rise above its transition temperature (Tg). The increase in temperature above the glass transition temperature of the polymer material makes the PTC polymer material nonconducting since chains of conductive particles of the polymer material are separated and dispersed. Therefore, the conventional resettable fuse is used to form electronic circuit protection devices that overcome the one-time-use limitation of standard fuses.

With reference to FIG. 6, multiple resettable fuses are constructed on a substrate (not numbered), and a conductive hole (70) is formed between two adjacent resettable fuses. Then, the multiple resettable fuses are separated by cutting along cutting lines (A—A), wherein each cutting line (A—A) passes through one conductive hole (70).

With further reference to FIG. 7, each resettable fuse is a rectangular block with a top face, a bottom face and two opposite sides and has a pair of semi-cylindrical conductive notches (71, 72) formed respectively on opposite sides of the rectangular block after cutting through the conductive holes (70). Each resettable fuse is composed of two conductive layers (not numbered) and a PTC layer (not numbered). The conductive layers are formed respectively on the top face and the bottom face, and the PTC layer is formed between the two conductive layers. The conductive notches (71, 72) have a concave wall (not numbered) and a metallic layer (not numbered) electroplated on the concave wall and are electrically connected respectively to the conductive layers. Two isolation gaps (73, 74) are formed respectively on the top face and the bottom face near the conductive notches (71, 72) to form a top conducting layer (not numbered), a bottom conducting layer (not numbered), a top non-conducting segment (not numbered) and a bottom non-conducting segment and to separate the conductive notches (71, 72) respectively from the top and bottom conductive layers. Thereby, the conductive layers are disconnected, the conductive notches (71, 72) serve as electrodes to attach to an electronic product, and current passes through the PTC layer so the device acts as a resettable fuse.

Each resettable fuse has a hold current that is defined as the maximum sustainable current that can pass through the resettable fuse without "blowing" the fuse. The hold current for a resettable fuse is directly proportional to the projected overlap (AA) between the top and bottom conductive layers. However, the non-conducting segments on the top and bottom layers reduce the projected overlap (AA) of the conductive layers of the resettable fuse and diminish the hold current of the resettable fuse.

Furthermore, drilling the conductive holes (70) during the manufacturing processes of the resettable fuses is troublesome and increases manufacturing costs.

The present invention has arisen to provide a method for manufacturing resettable fuses to overcome and obviate the drawbacks of conventional resettable fuses.

SUMMARY OF THE INVENTION

A first objective of the present invention is to provide a method for manufacturing resettable fuses that have a larger hold current relative to conventional resettable fuses of the same size.

A second objective of the present invention is to provide a method for manufacturing resettable fuses to reduce manufacturing cost.

Further benefits and advantages of the present invention will become apparent after a careful reading of the detailed description in accordance with the drawings.

DETAILED DESCRIPTION OF THE PREFERRED EMBODIMENT

A method for manufacturing resettable fuses in accordance with the present invention comprises acts of forming multiple bottom electrodes on a substrate, laminating a fuse layer on the substrate, forming multiple top electrodes, forming multiple conductive holes, removing the substrate, optionally forming isolation and contact elements, and separating individual resettable fuses.

Figure 1B:
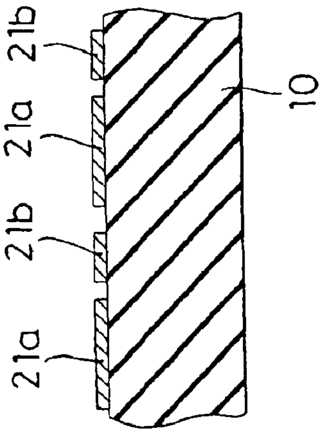
FIG. 1B is a cross-sectional side plane view of a segment of the substrate in FIG. 1A with the bottom electrode areas.
Figure 1A:
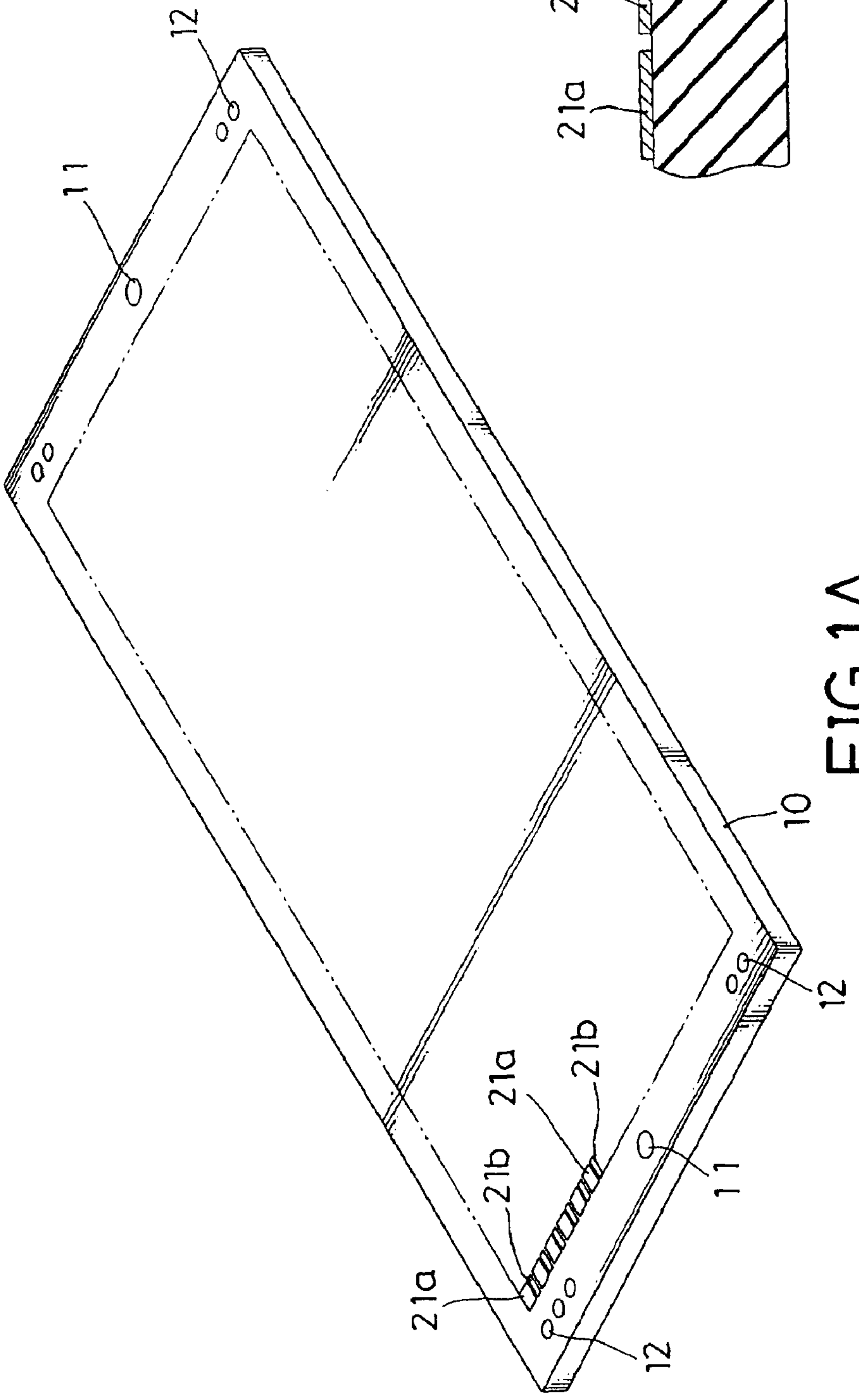
FIG. 1A is a perspective view of substrate with multiple bottom electrode areas in accordance with the present invention formed by a method for manufacturing resettable fuses in accordance with the present invention.

With reference to FIGS. 1A and 1B, the act of forming multiple bottom electrodes (21*a*, 21*b*) on a substrate (10) with a top face (not numbered) is carried out by roughening the top face of a substrate (10) and forming multiple bottom electrodes (21*a*, 21*b*) and optionally forming positioning spots (11, 12) on the top face of the substrate (10). A photolithography process comprising application of a photo-resistant coating, exposure, development, etching, etc. is used to form the bottom electrodes (21*a*, 21*b*) and optional positioning spots (11, 12). Since photolithography processes are well-known, further description of appropriate photolithography processes is omitted. An anti-corrosive material such as nickel is applied to the substrate (10) covered by a mask (not shown) to form the bottom electrodes (21*a*, 21*b*) before the photo-resistant is removed.

The bottom electrodes (21*a*, 21*b*) are grouped in pairs (not numbered), and each pair comprises a first bottom electrode (21*a*) and second bottom electrode (21*b*). The second bottom electrodes (21*b*) are smaller than the first bottom electrodes (21*a*). The first and second bottom electrodes (21*a*, 21*b*) are alternatively arranged on the substrate (10) in pairs, and each pair of first bottom electrode (21*a*) and second bottom electrode (21*b*) defines a size of one resettable fuse.

Figure 2A:
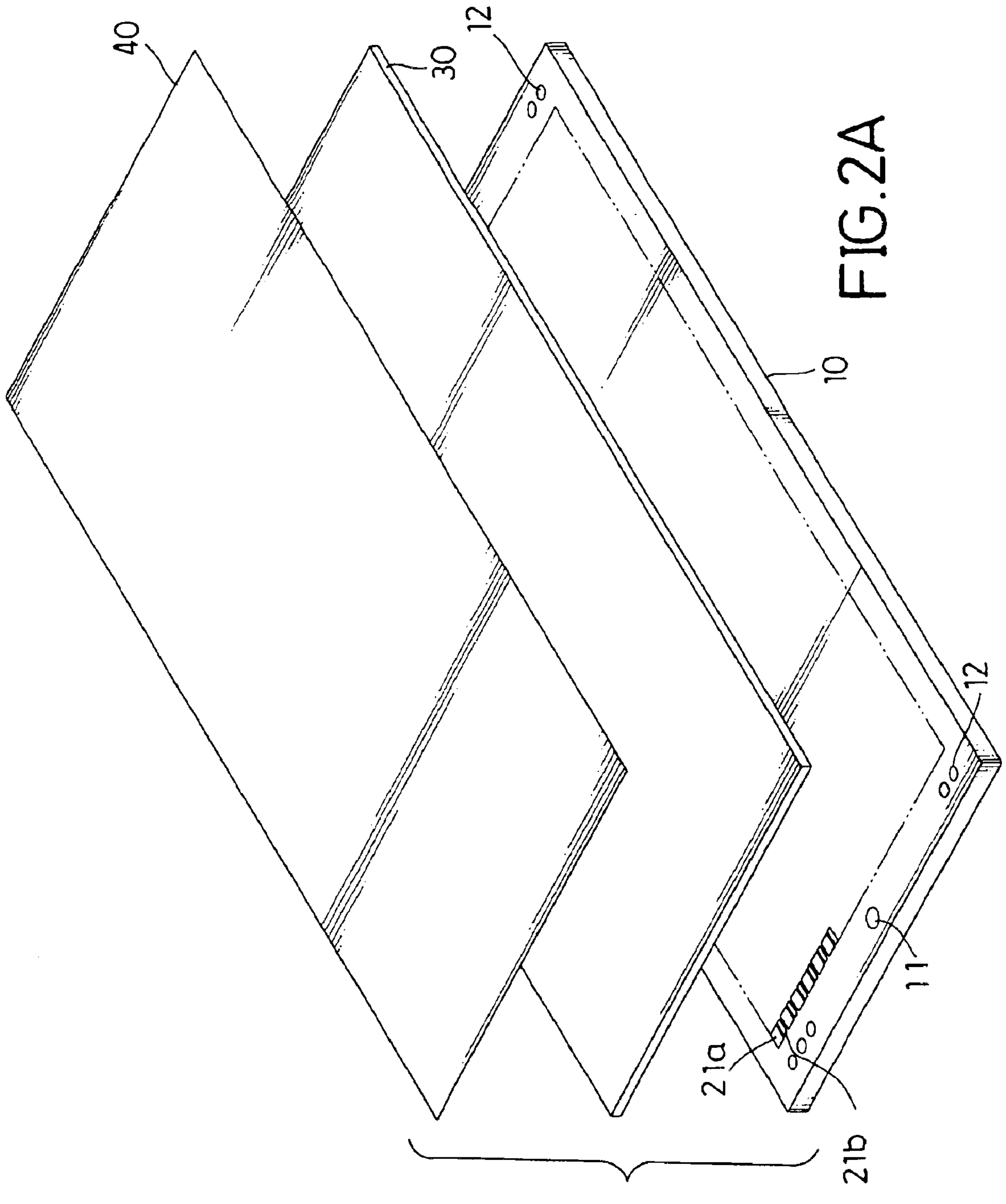
FIG. 2A is an exploded perspective view of layers used to form resettable fuses in accordance with the present invention by the method in accordance with the present invention.
Figure 2B:
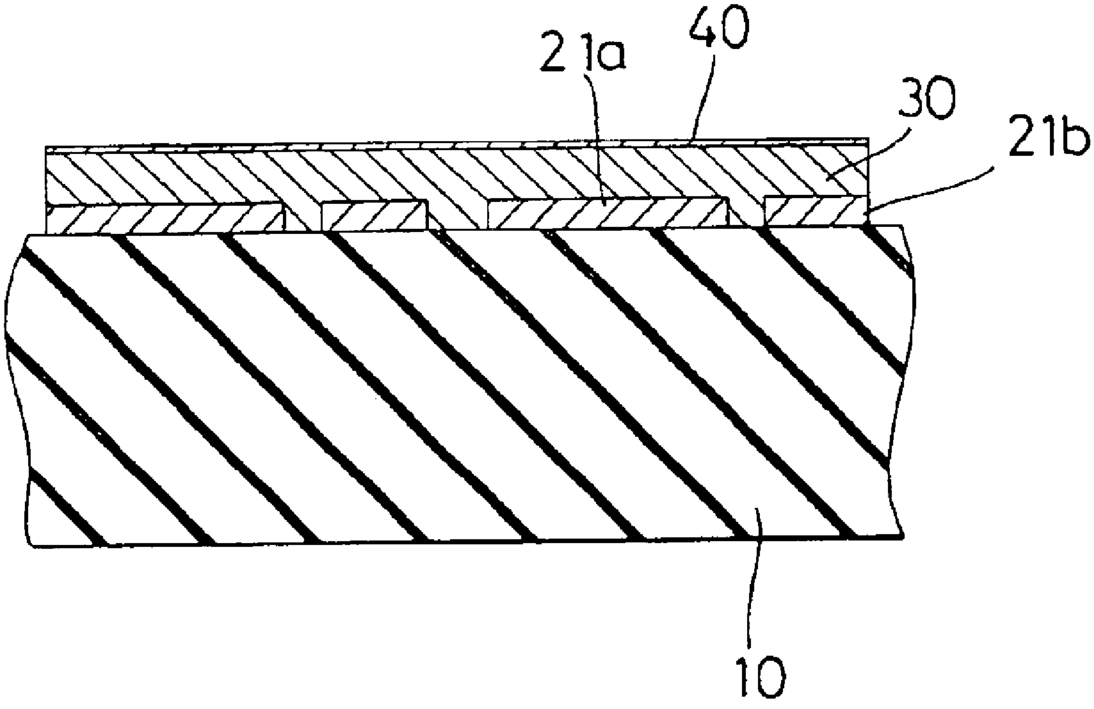
FIG. 2B is a cross-sectional side plan view of the layers in FIG. 2A.

With reference to FIGS. 2A and 2B, a fuse layer (30) with a top face and a bottom face is laminated on the substrate (10) by compressing and covers the bottom electrodes (21*a*, 21*b*) and the positioning spots (11, 12). The fuse layer (30) is made of a copolymer material with a positive temperature coefficient of resistance (PTC copolymer material).

Then, top electrodes (41) are formed on the top face of the fuse layer (30) respectively over the pairs of bottom electrodes (21*a*, 21*b*) on the bottom face of the fuse layer (30) by laminating a copper foil (40) on the fuse layer (30) and etching the copper foil (41). The copper foil (40) is laminated to the fuse layer (30) by compressing. The laminated substrate (10) is X-rayed to precisely locate the positioning spots (11, 12) in the substrate (10) under the fuse layer (30) and the copper foil (40). Mounting holes (not numbered) may optionally be drilled at the positioning spots (11, 12) so the laminated substrate (10) can be securely mounted for etching. The copper foil (40) and fuse layer (30) are etched between adjacent pairs of first and second bottom electrodes (21*a*, 21*b*) using a photolithographic process.

Figure 3:
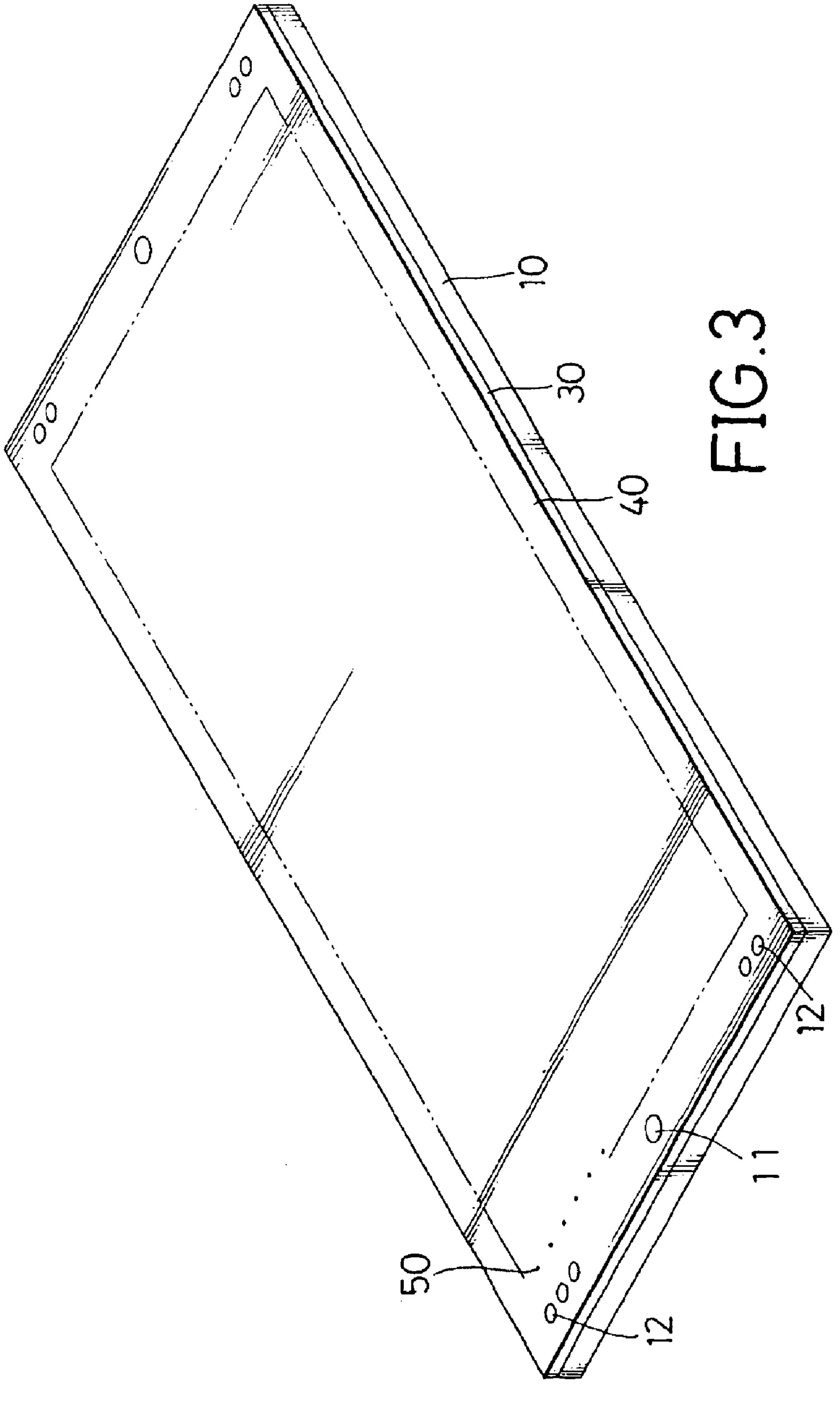
FIG. 3 is a perspective view of the layers of the resettable fuse in FIG. 2B with multiple conductive holes formed through the layers by the method in accordance with the present invention.
Figure 4B:
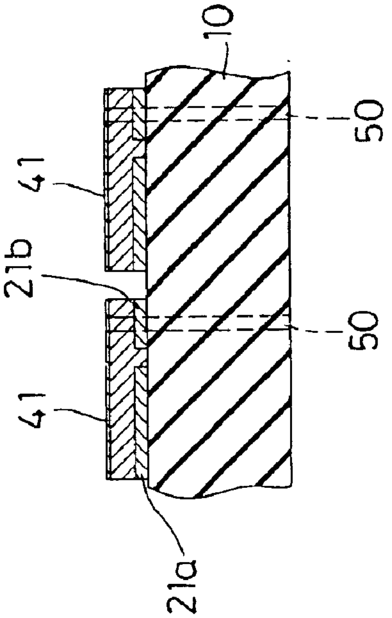
FIG. 4B is a cross-section side plan view of the semi-finished product in FIG. 4A showing the conductive holes and the top electrode areas.
Figure 4A:
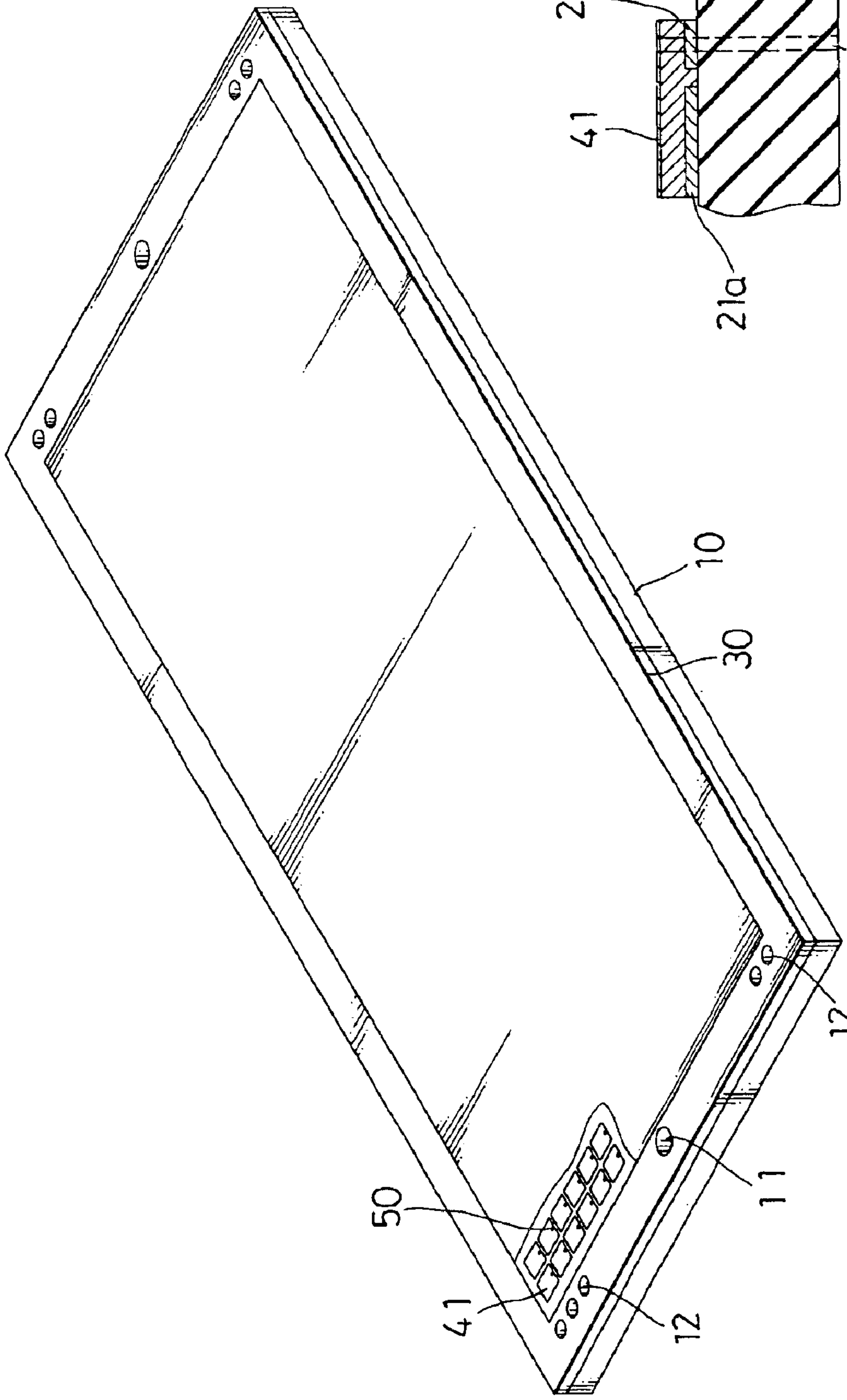
FIG. 4A is a perspective view of a semi-finished resettable in accordance with the present invention with multiple top electrode areas formed on the copper foil by the method in accordance with the present invention.

With reference to FIGS. 3, 4A and 4B, multiple conductive holes (50) are formed by forming holes (not numbered) with walls (not numbered) and electroplating the walls of the holes. The conductive holes (50) are formed respectively through the top electrodes (41), the second bottom electrodes (21*b*), the fuse layer (30) and the substrate (10) by laser drilling or mechanical punching. Each conductive hole (50) has a wall in contact with a top electrode (41), the fuse layer (30) and a corresponding second bottom electrode (21*b*). The walls of the conductive holes (50) are electroplated with metallic material to electrically connect the top electrodes (41) and the corresponding second bottom electrodes (21*b*).

Figure 5:
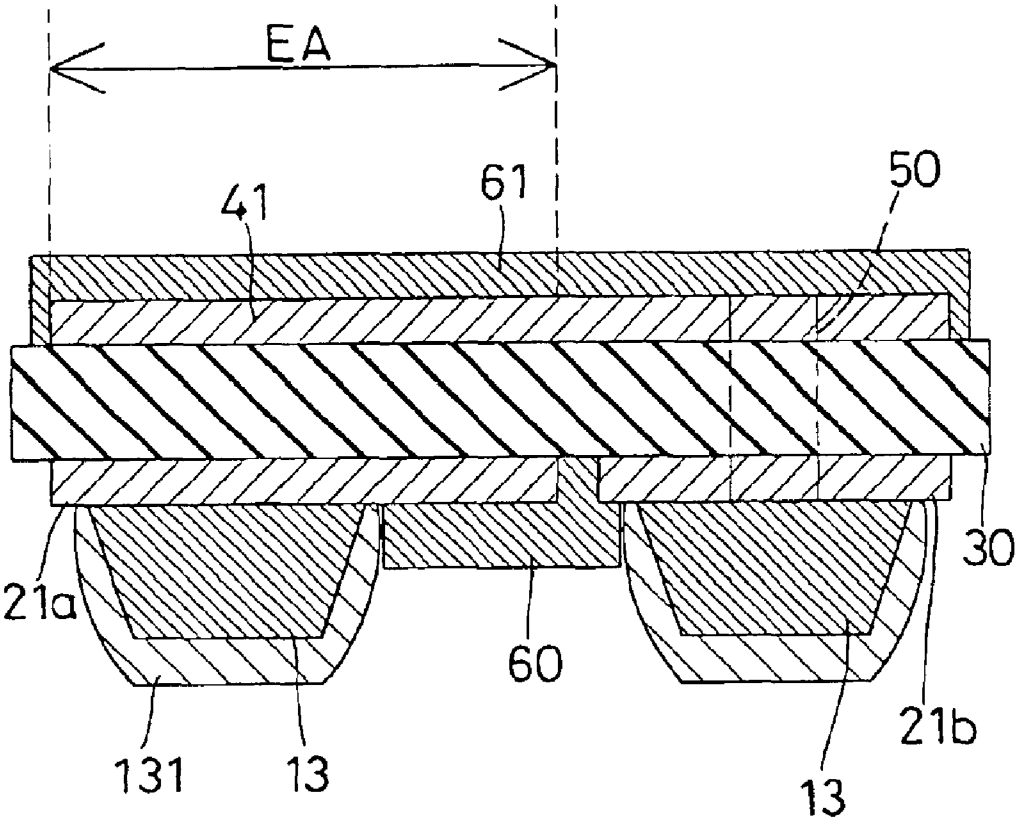
FIG. 5 is a cross-section side plan view of a resettable fuse in accordance with the present invention with isolating layers formed between the bottom electrode areas and multiple conductive stubs formed on the bottom electrode areas.
Figure 6:
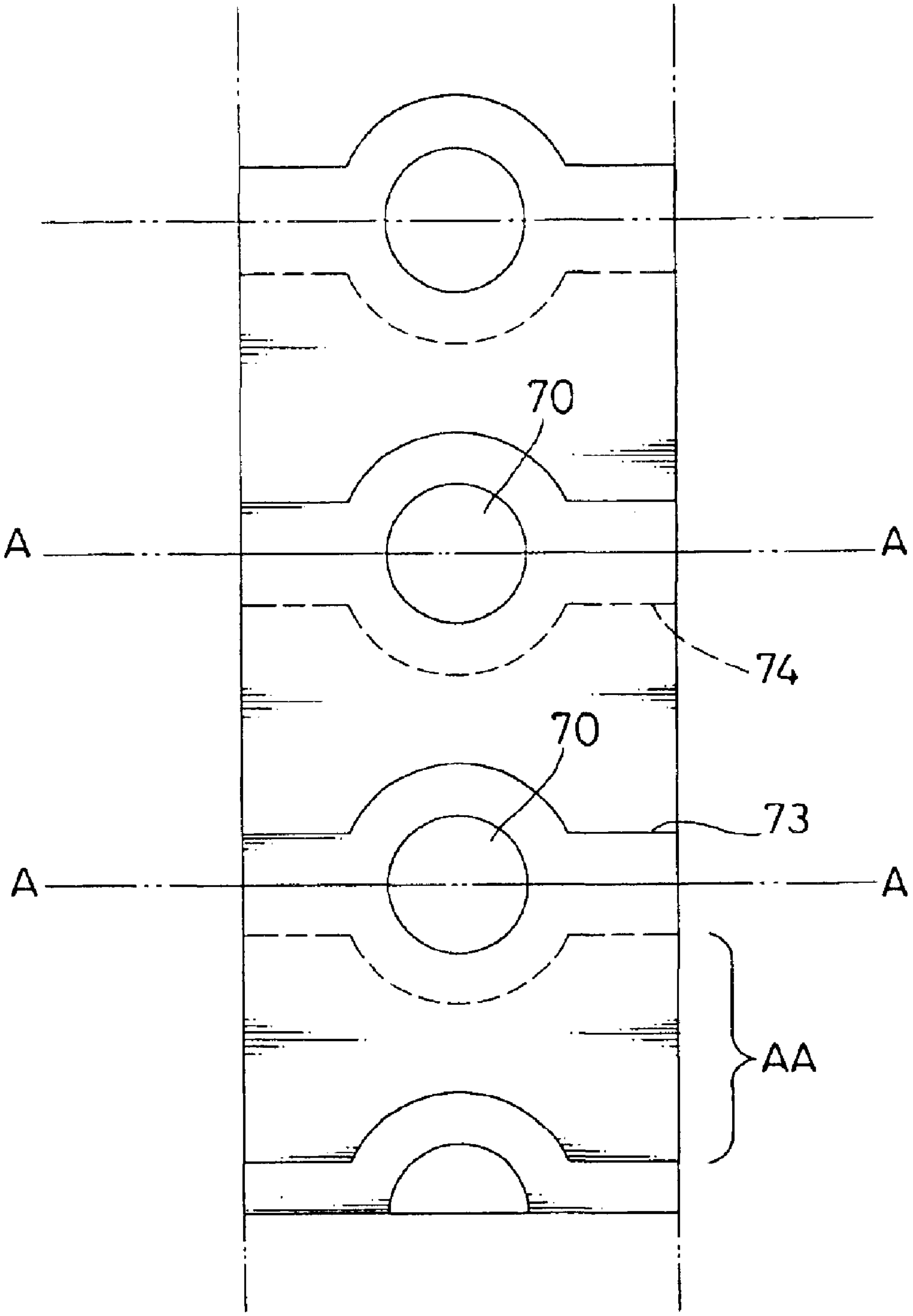
FIG.6 PRIOR ART
FIG. 6 is a top plane view of conventional resettable fuses in accordance with the prior art before separating into individual fuses.
Figure 7:
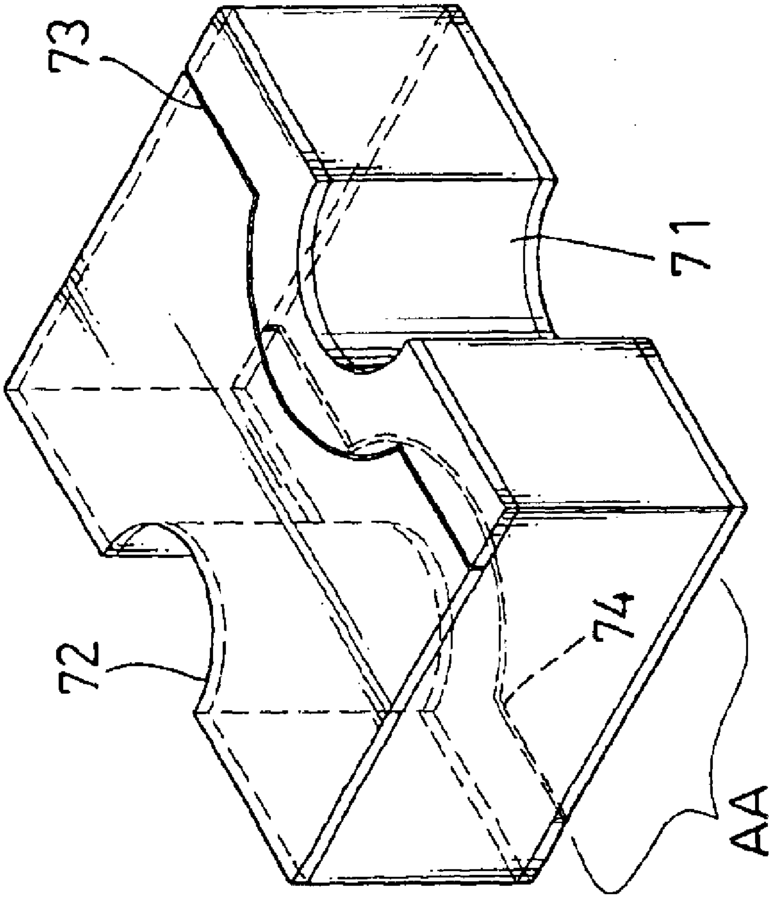
FIG.7 PRIOR ART
FIG. 7 is a perspective view of a conventional resettable fuse in accordance with the prior art.

With reference to FIG. 5, the substrate (10) is removed by etching to expose the bottom electrodes (21*a*, 21*b*).

The optional isolation and contact elements are formed by applying an isolating layer (61), applying a bottom isolating block (60) and forming electrical contacts (not numbered). The isolating layer (61) is an electrical insulating material and is applied over and electrically isolates the top electrodes (41) from elements external to the resettable fuses. The bottom isolating blocks (60) are attached respectively to the resettable fuses to electrically separate the first bottom electrode (21*a*) from the second bottom electrode (21*b*). Parts of the substrate (10) are selectively retained during the etching process to form abutting stubs (13) respectively on the bottom electrodes (21*a*, 21*b*) to serve as foundations for electrical leads (not numbered) connected respectively to the bottom electrodes (21*a*, 21*b*). The electrical leads are formed by coating the abutting stubs (13) with a solder layer (131) made of nickel, gold or tin so the resettable fuses can be easily attached to electronic devices.

Finally, the completed resettable fuses are separated into individual resettable fuses by cutting around the top electrodes (41).

Still with reference to FIG. 5, the hold current of the resettable fuse is determined by a projected overlap (EA) of the electrodes through the fuse layer (30). Since the second bottom electrode (21*b*) is electrically connected to the top electrode (41) by the conductive hole (50), the projected overlap (EA) is an overlapping area of the first bottom electrode (21*a*) and the top electrode (41). By making the second bottom electrode (21*b*) very small, a resettable fuse in accordance with the present invention that is the same size with a conventional resettable fuse will have a much larger projected overlap (EA). Consequently, the hold current will be larger than that of the conventional resettable fuses.

Furthermore, each resettable fuse has only one conductive hole (50) and no need to divide the conductive layers into two electrodes. Consequently, the drilling processes are reduced by half, which decreases the manufacturing cost. Furthermore, the electrical leads attached to the bottom electrodes (21*a*, 21*b*) reduce the resettable fuse installation cost.

Although the invention has been explained in relation to its preferred embodiment, many other possible modifications and variations can be made without departing from the spirit and scope of the invention as hereinafter claimed.

What is claimed is:

1. A resettable fuse comprising:

a fuse layer having a top face and a bottom face and made of copolymer material possessing a positive temperature coefficient of resistance;

a top electrode formed on the top face of the fuse layer;

a first bottom electrode formed on the bottom face of the fuse layer;

a second bottom electrode smaller than the first bottom electrode formed on the bottom face of the fuse layer adjacent to the first bottom electrode; and a conductive hole with a wall electroplated with conductive material defined through the top electrode, the fuse layer and the second bottom electrode to electrically connect the top electrode and the second bottom electrode;

wherein the hold current of the resettable fuse is determined by a projected overlap of the first bottom electrode and the top electrode through the fuse layer.

2. The resettable fuse as claimed in claim 1, wherein an electrical lead comprises an abutting stub formed on each of the first and second bottom electrodes; and a solder layer is coated around each abutting stub to electrically connect the bottom electrodes to an electronic device.

3. The resettable fuse as claimed in claim 2, wherein a bottom isolating block is formed between the first bottom electrode and the second bottom electrode in each pair.

4. The resettable fuse as claim 3, wherein a top isolating layer is formed over the top electrode.

* * * * *